United States Patent [19]

Keller et al.

[11] Patent Number: 5,778,746

[45] Date of Patent: Jul. 14, 1998

[54] TANDEM POINT CUTTING TOOL

[75] Inventors: Jeffrey S. Keller, Cincinnati; Alexander Reid, West Chester, both of Ohio

[73] Assignee: General Electric Company, Cincinnati, Ohio

[21] Appl. No.: 668,643

[22] Filed: Jun. 20, 1996

[51] Int. Cl.[6] ................................................ B23B 27/00
[52] U.S. Cl. .................. 82/112; 82/128; 82/158; 407/68
[58] Field of Search ............................ 82/112, 128, 158, 82/161; 407/68, 67, 69, 73, 77, 88

[56] References Cited

U.S. PATENT DOCUMENTS

| | | | |
|---|---|---|---|
| 1,383,981 | 7/1921 | Catlin | 82/158 |
| 1,626,953 | 5/1927 | Muller | 82/158 |
| 1,733,578 | 10/1929 | Burke . | |
| 2,275,327 | 3/1942 | Sheridan et al. | 407/68 |
| 2,351,892 | 6/1944 | Welbury . | |
| 2,645,000 | 7/1953 | Finch . | |
| 3,387,516 | 6/1968 | Martin . | |
| 3,626,793 | 12/1971 | Rice | 82/158 |
| 3,760,475 | 9/1973 | Gleason . | |
| 3,813,970 | 6/1974 | Mitchell . | |
| 3,893,356 | 7/1975 | Atzberger . | |
| 4,151,766 | 5/1979 | Eichenhofer . | |
| 4,364,290 | 12/1982 | Astle . | |
| 4,388,846 | 6/1983 | Kopecko et al. . | |
| 4,393,735 | 7/1983 | Eckle et al. . | |
| 4,478,116 | 10/1984 | Fuller | 82/112 |
| 4,510,828 | 4/1985 | Bogaerts et al. . | |
| 4,523,499 | 6/1985 | Aldridge, Jr. . | |
| 4,550,488 | 11/1985 | Okubo et al. . | |
| 4,640,159 | 2/1987 | Stojanovski . | |
| 4,867,021 | 9/1989 | Bogaerts et al. . | |
| 4,938,110 | 7/1990 | Ruby . | |
| 5,095,786 | 3/1992 | Bellinghausen et al. . | |
| 5,297,460 | 3/1994 | Hartman et al. . | |

Primary Examiner—A. L. Pitts
Assistant Examiner—Henry W. H. Tsai
Attorney, Agent, or Firm—Andrew C. Hess; Nathan D. Herkamp

[57] ABSTRACT

A tandem tool point apparatus for simultaneously machining surfaces on opposite sides of a thin wall may be used on an annulus having flat machining surfaces or on a circular wall having curved machining surfaces. The tool has spaced apart first and second tool points mounted in first and second tool holders respectively and a coupling element for coupling the first and second tool holders together to maintain the first and second tool points in tandem during a machining operation on the opposite sides of the wall. The apparatus preferably includes a tandem adjusting element for simultaneously adjusting the space between the tool points. A spacer may be used between the holders extending longitudinally over a portion of a length of the holders and the adjusting element longitudinally disposed between the tool points. The present invention is particularly useful in a lathe assembly having a chuck operable for rotating an annular workpiece about a chuck axis and a tool support operable to translate axially and radially with respect to the chuck axis. Mounted in the tool support is the tandem point tool and the tool holders in the form of longitudinally extending tool bars having tool point inserts mounted at aft portions of the bars and a longitudinally extending spacer disposed between the bars at forward portions of the bars.

15 Claims, 3 Drawing Sheets

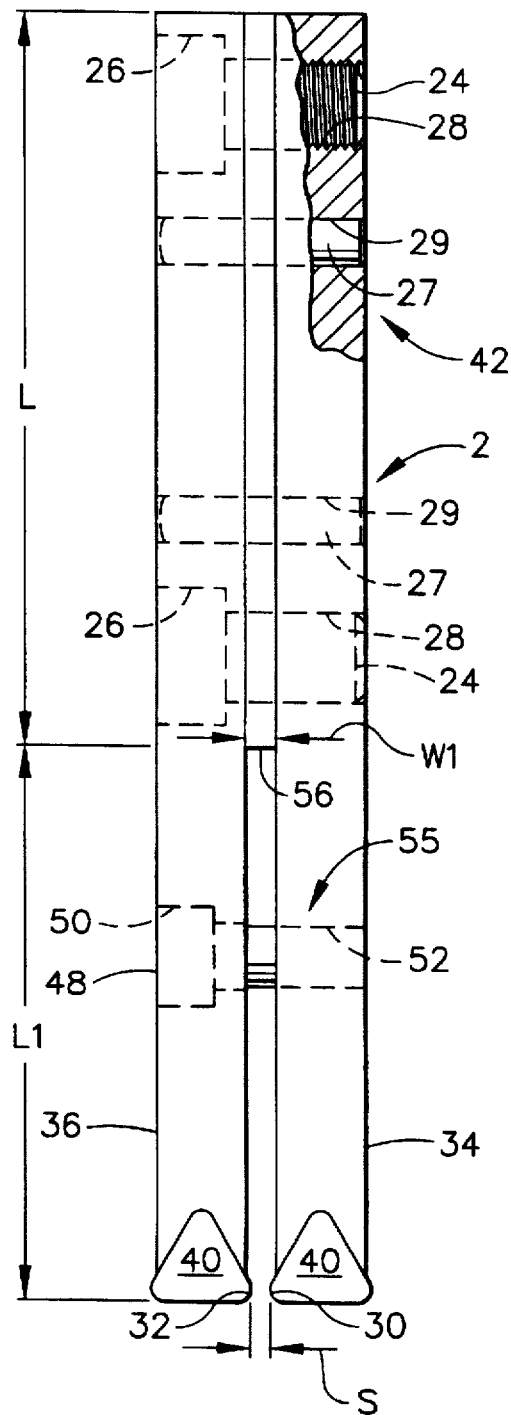
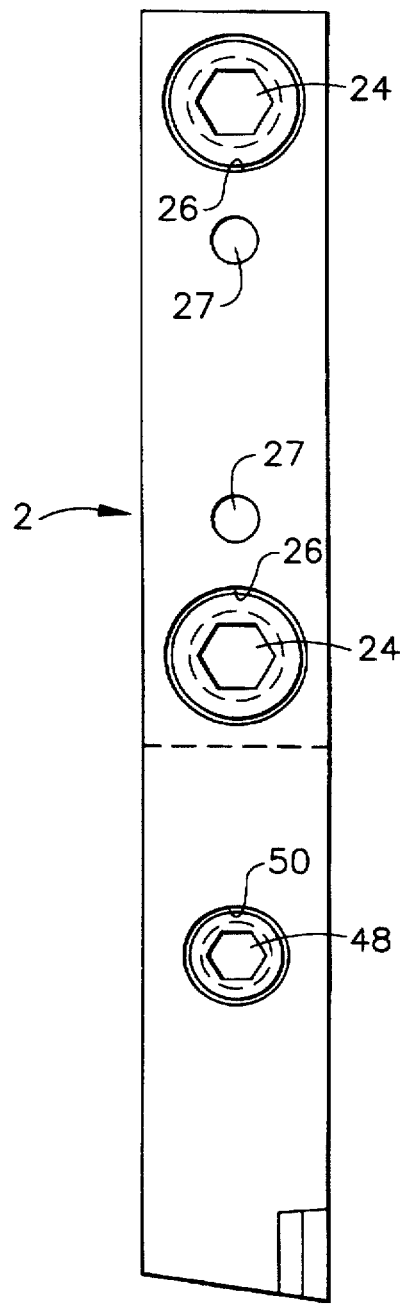
FIG. 2
FIG. 3

TANDEM POINT CUTTING TOOL

BACKGROUND OF THE INVENTION

1. Field of the Invention

The present invention relates to machining apparatus that remove machine stock by turning such as lathes and, more particularly, to a cutting tool for such an apparatus used to simultaneously machine parallel surfaces of a thin wall, such as a ring or annulus.

2. Discussion of the Background Art

Annular metal walls such that have relatively thin walls with parallel flat or circular surfaces often are very difficult to machine. This is true of a circular or curved surfaces circumscribed about an axis of rotation and of a annulus having opposite sided flat surfaces perpendicular to an axis of rotation and having circular edges. Static and rotating seals, flanges, rings, and casings found in gas turbine engines often have very thin cross-sections or walls which are very difficult to machine. Such walls have parallel surfaces, both of which must be machined. Parallel flat annular surfaces extending between inner and outer radii of an annulus are machined in the case of seals, rings, and flanges and parallel circular surfaces along the inside diameters (ID) and outside diameters (OD) are machined in the case of thin rings and casings.

One particular area of concern is large gas turbine engines, which often employ large diameter rotating seals as well as other large diameter thin wall components, having radially oriented thin wall flanges and stiffener webs. The length to width ratio of these features is very large (16:1 in some cases) such that machining is very difficult, particularly, as regards maintaining parallelism between opposite machining surfaces of the thin wall part of feature. The major obstacle seems to be part deflection during the machining process.

Prior art or conventional methods of machining these surfaces included using single tool point lathe fixtures and machining operations which require multiple operations and fixtures. In one exemplary operation using conventional lathe apparatus parallelism was rarely within 0.008 inches even after significant rework. Finish turn passes of 0.010 inches in depth are used which represents merely one tenth of total part thickness, consequently part deflection is a significant problem. Subsequent re-cuts are only marginally effective as the surface becomes increasingly work-hardened and require tool and/or fixture changes. These fixture and tool changes require additional machine operator time and interdictions which inherently decreases the repeatability of a part manufacturing process thus reducing the ability to control product quality and tolerances. These drawbacks also increase the cost of the part and process.

It is, therefore, very desirable to have an apparatus and method for accurately machining parallel surfaces of thin wall components such as ring webs on rotating seals or other annular flanges with a minimum number of fixture changes and/or tools and a minimal amount of machine operator time.

To this end, the present invention was made to simultaneously machine surfaces on opposite sides of a thin wall component or feature with tandem tool points that are kinematicly tied or coupled together so as to ride on and machine the surfaces in tandem. Many lathe apparatus have been designed, developed and built to simultaneously machine surfaces on opposite sides of a thick wall component such as brake rotors some of which are disclosed in patents referenced herein. However, all of these brake rotor cutters and machine apparatus are designed to machine thick rotors and do not use tandem tool points, i.e. tool points that move in tandem or unison across the machining surfaces and perpendicular to the surfaces.

SUMMARY OF THE INVENTION

A tandem tool point apparatus for simultaneously machining surfaces on opposite sides of a thin wall has spaced apart first and second tool points mounted in first and second tool holders, respectively, and a coupling means for coupling the first and second tool holders together to maintain the first and second tool points in tandem during a machining operation on the opposite sides of the wall. The apparatus, preferably, includes an adjusting means for adjusting a space between the tool points and may include tandem adjusting means for simultaneously adjusting the space between the tool points. A spacer may be used between the holders extending longitudinally over a portion of a length of the holders and the adjusting means longitudinally disposed between the tool points.

In one particular embodiment, the tool holders are longitudinally extending tool bars having tool point inserts mounted at aft portions of the bars and a longitudinally extending spacer disposed between the bars at forward portions of the bars. The tool points are on inserts mounted at aft positions of the bars such that a longitudinally extending gap lies between the spacer and the tool points and an adjusting means for adjusting the gap is longitudinally disposed between the spacer and the tool points. The adjusting means may include a bolt engaging one of the bars and threadingly connected to the other bar.

The present invention is particularly useful in a lathe assembly having a chuck operable for rotating an annular workpiece about a chuck axis and a tool support operable to translate axially and radially with respect to the chuck axis. Mounted in the tool support is a tandem point tool for simultaneously machining surfaces on opposite sides of a wall of the workpiece and having spaced apart first and second tool points, the first and second tool points mounted in first and second tool holders respectively, and a coupling means for coupling the first and second tool holders together to maintain the first and second tool points in tandem during a machining operation on the opposite sides of the wall. The lather assembly, preferably, includes an adjusting means for adjusting a space between the tool points which may be a tandem adjusting means for simultaneously adjusting the space between the tool points. A spacer may be used between the holders extending longitudinally over a portion of a length of the holders and the adjusting means is longitudinally disposed between the tool points. The tool holders may be longitudinally extending tool bars having tool point inserts mounted at aft portions of the bars, a longitudinally extending spacer disposed between the bars at forward portions of the bars, and the tool points on inserts mounted at aft positions of the bars such that a longitudinally extending gap lies between the spacer and the tool points. An adjusting means for adjusting the gap may be longitudinally disposed between the spacer and the tool points. The adjusting means may include a bolt engaging one of the bars and threadingly connected to the other one of the bars.

ADVANTAGES OF THE INVENTION

The present invention provides an advantage of allowing a thin wall to be machined on two sides simultaneously and without using more than one tool. This advantage further represents a savings in machine time, operator time and the number of tools that must be used and maintained in inventory. All of these advantages represent a large cost savings over conventional methods used to machine thin wall workpieces. The present invention has the advantage of requiring less machining steps and tool changes, which increases repeatability of the process, as well as lowering its cost. The present invention also provides more accuracy with less machine down time and less operator time as well as uncompromised and increased repeatability, two factors which greatly enhance overall productivity and quality.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 2 is a cross-sectional view of the exemplary embodiment of the tool of the present invention illustrated in FIG. 1;

FIG. 3 is a top cross-sectional view of the tool illustrated in FIG. 2; and

DETAILED DESCRIPTION

Figure 1:
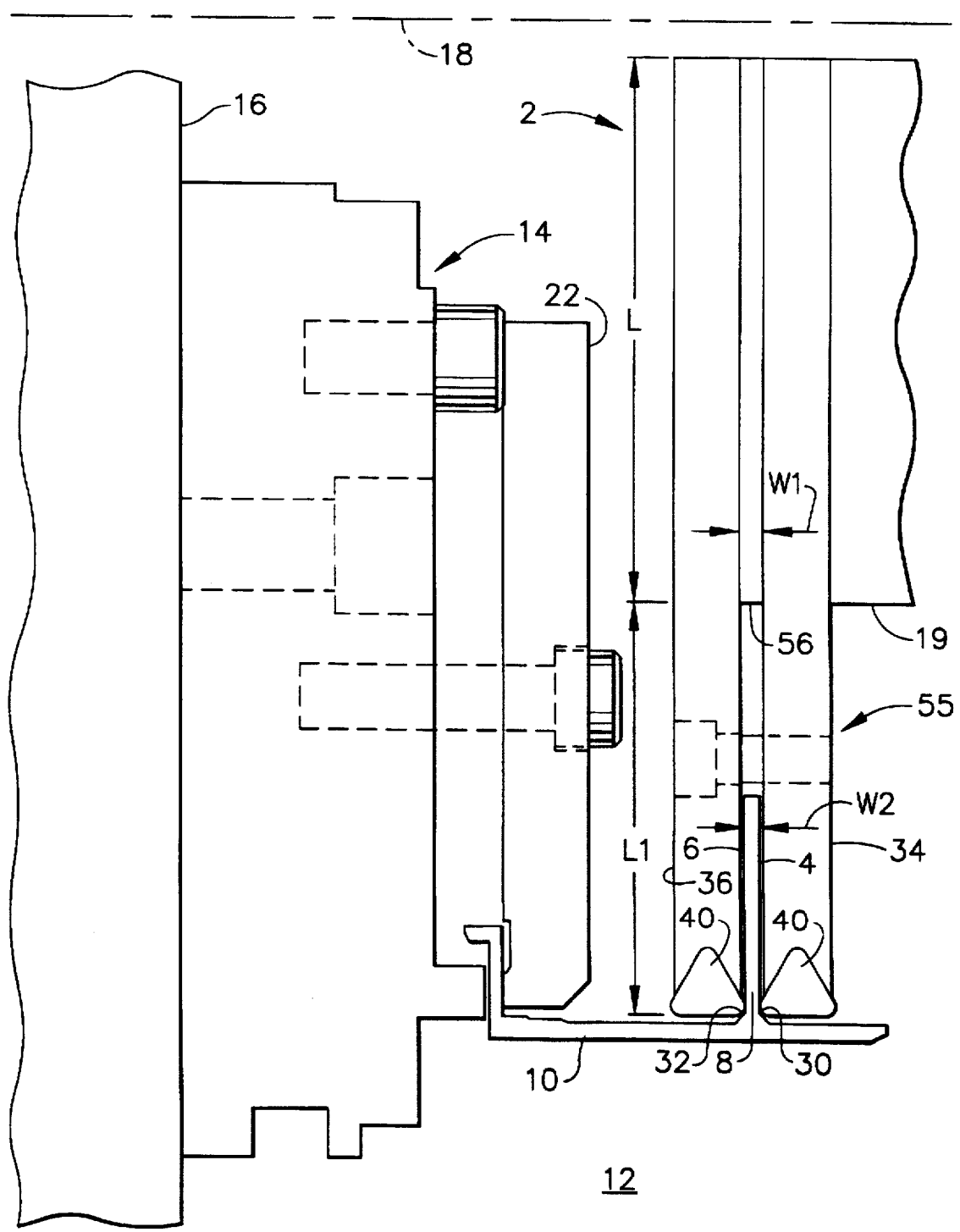
FIG. 1 is a cross-sectional view of part of a lathe assembly including an exemplary embodiment of the present invention.

Referring now to the drawings in detail, wherein identical numerals indicate the same elements throughout the figures, FIG. 1 illustrates an exemplary embodiment of the present invention, a tandem point tool assembly 2 for simultaneously cutting first and second machining surfaces 4 and 6, respectively, on opposite sides of a thin wall 8 of a workpiece 10 during a machining process. The first and second machining surfaces 4 and 6 respectively are flat and on opposite sides of the thin wall 8 which is a flat annulus. The invention is illustrated as it might be used on a lathe assembly 12 which has a fixture 14 securing the workpiece 10 to a rotatable chuck 16 having an axis of rotation 18. The workpiece 10 Illustrated in FIG. 1 is a gas turbine annular seal having a thin wall 8 web. The workpiece 10 is clamped to the fixture 14 by inner annular clamps 22. The tandem point tool assembly 2 is mounted on a tool support 19 of the lathe assembly 12 and the support is operable to translate axially and radially with respect to the axis of rotation 18.

The machining process involves turning the workpiece 10 and using the tandem point tool assembly 2 of the lathe assembly 12 to remove material from the flat annular first and second machining surfaces 4 and 6, respectively, of the thin wall 8 web or annulus. The tandem point tool assembly 2 has spaced apart first and second tool points 30 and 32, respectively, mounted in first and second longitudinally extending parallel tool bars 34 and 36, respectively, which serve as tool holders for triangular ceramic cutters commonly referred to as inserts 40 which provide three tool points on each insert. A coupling means in the form of a threaded bolt assembly 42 is used for coupling the first and second tool bars 34 and 36, respectively, together in order to maintain the first and second tool points 30 and 32, respectively, in tandem during the machining operation. Thus the spaced apart first and second tool points 30 and 32, respectively, move in tandem which by definition includes in directions across the first and second machining surfaces 4 and 6, respectively, of the thin wall 8 web or annulus, and in a direction perpendicular to these surfaces which is parallel to the axis of rotation 18. The threaded bolt assembly 42 is illustrated in the form of a set of first shoulder bolts 24 shouldered in first recesses 26 in the first tool bar 34 and threaded into threaded first bores 28 in the second tool bar 36. Locating pins 27 extending perpendicularly from the second tool bar 36 into matching locating holes 29 in the first tool bar 34 may be used to help locate, center, and align the bars during assembly of the tandem point tool assembly 2.

An adjusting means for adjusting a space S between the first and second tool points 30 and 32, respectively, is illustrated in the form of an adjustable shoulder bolt 48 shouldered in a second recess 50 in the first tool bar 34 and threaded into a threaded second bore 52 in the second tool bar 36 to provide a tandem adjusting means 55 for simultaneously adjusting the space S between the tool points. A spacer 56 is preferably used between the first and second tool bars 34 and 36, respectively, to roughly establish the space S.

Fine adjustment of the space is made by the operator using the tandem adjusting means by turning the adjustable shoulder bolt 48. The spacer 56 extends longitudinally over a portion of a full length L of the first and second tool bars 34 and 36, respectively, and the tandem adjusting means 55 is longitudinally disposed between the spacer and tool points. The spacer is preferably constructed with a first width W1 that is slightly wider than a second width W2 of the thin wall 8. This, therefore, requires that the adjustable shoulder bolt 48 be turned to thread in to the threaded second bore 52 to place the first and second tool bars 34 and 36, respectively, in tension and the first and second tool points 30 and 32 in tension against the first and second machining surfaces 4 and 6, respectively. One reason for making the spacer with the first width W1 slightly wider than the second width W2 of the thin wall 8 is to allow for slight discrepancies in the tool point sizes of the inserts 40. While the convenience of the three tool point triangular insert is very useful the inaccuracies attendant with its manufacture and mounting to the bars can easily be adjusted for with the present invention. While these discrepancies to tolerances may amount to a couple of mils (±0.002 inches) or more the tandem adjusting means 55 may be designed to adjust the space S between the first and second tool points 30 and 32, respectively, to about ±0.005 inches or more if so desired.

Figure 4:
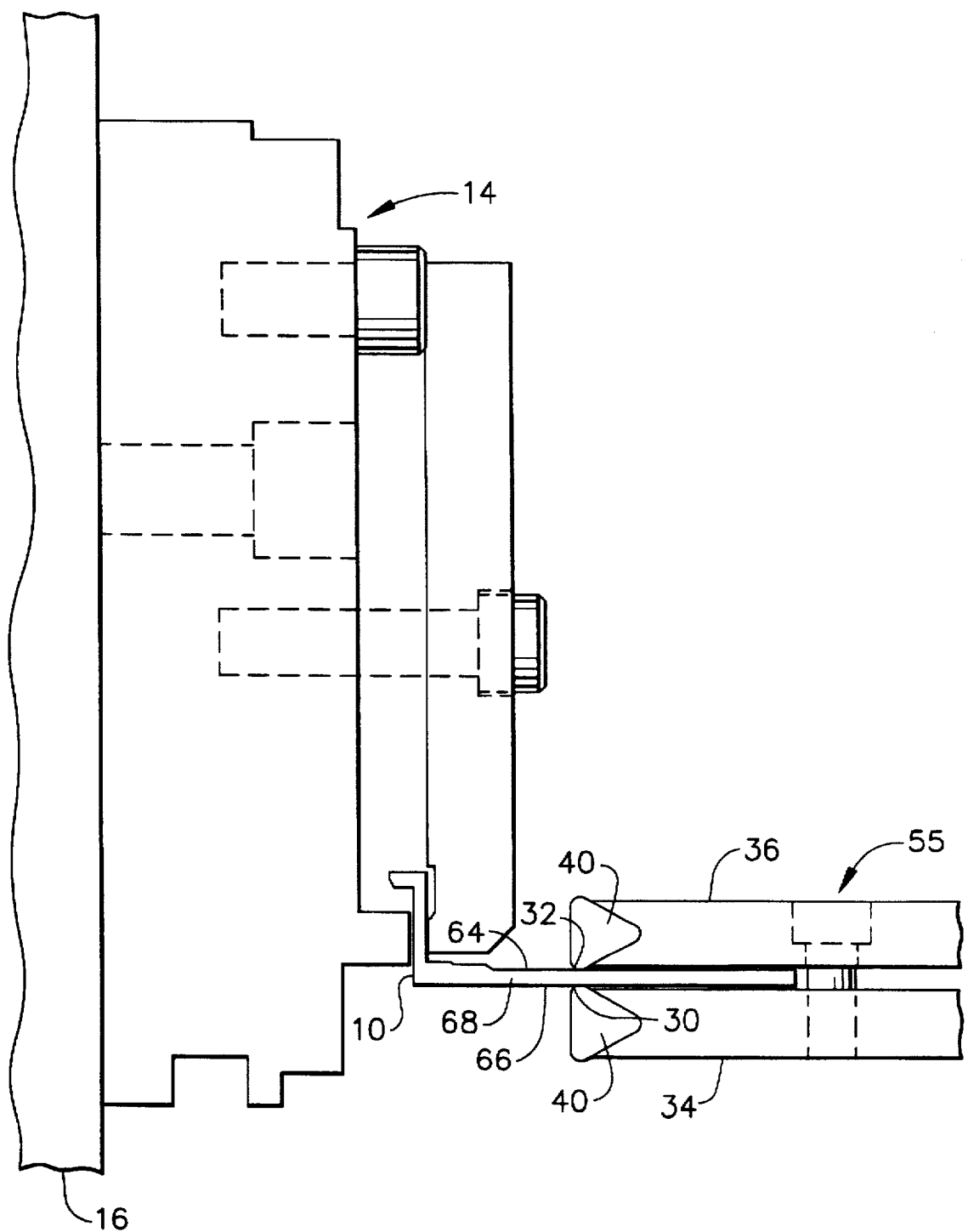
FIG. 4 is a cross-sectional view of part of a lathe assembly illustrating an alternate embodiment of the present invention.

The present invention may also be used on circular or annular surfaces in addition to the flat annular first and second machining surfaces 4 and 6, respectively, of the thin wall 8 which has the shape of an annulus. Illustrated in FIG. 4 is the tandem point tool assembly 2 of the lathe assembly 12 oriented to remove material from inner and outer circular machining surfaces 64 and 66, respectively, of a thin circular wall 68 of a different workpiece 10.

While the preferred embodiment of our invention has been described fully, in order to explain its principles, it is understood that various modifications or alterations may be made to the preferred embodiment without departing from the scope of the invention as set forth in the appended claims.

We claim:

1. A tandem tool point apparatus for simultaneously machining surfaces on opposite sides of a thin wall, said apparatus comprising:

spaced apart first and second tool points, said first and second tool points mounted in first and second tool holders respectively, said first and second tool holders mounted on a tool support, and a coupling means for coupling said first and second tool holders together to maintain said first and second tool points in tandem during a machining operation on the opposite sides of the wall, said coupling means comprising a longitudinally spaced apart pair of coupling bolts disposed through said first and second tool holders.

2. An apparatus as claimed in claim 1 further comprising an adjusting means for adjusting a space between said tool points, said adjusting means longitudinally disposed between said tool points and said coupling means.

3. An apparatus as claimed in claim 2 wherein said adjusting means includes tandem adjusting means for simultaneously adjusting said space between said tool points.

4. An apparatus as claimed in claim 3 further comprising a spacer between said holders extending longitudinally over at least a portion of a length of said holders such that said adjusting means is longitudinally disposed between said spacer and said tool points.

5. An apparatus as claimed in claim 1 wherein:

said tool holders are longitudinally extending parallel tool bars having tool point inserts mounted at aft portions of said bars, a longitudinally extending spacer is disposed between said bars at forward portions of said bars, said tool points are on inserts mounted at aft positions of said bars such that a longitudinally extending gap lies between said spacer and said tool points, and an adjusting means for adjusting said gap, said adjusting means longitudinally disposed between said spacer and said tool points.

6. An apparatus as claimed in claim 5 wherein said adjusting means comprises an adjusting bolt engaging one of said bars and threadingly connected to another of said bars.

7. An apparatus as claimed in claim 1 wherein:

said pair of coupling bolts comprise a set of first shoulder bolts, and said coupling means further comprises said first shoulder bolts shouldered in a set of longitudinally spaced apart first recesses in said first tool holder and threaded into a set of longitudinally spaced apart first threaded bores in said second tool holder.

8. An apparatus as claimed in claim 7 further comprising a spacer between said holders extending longitudinally over at least a portion of a length of said holders between said coupling bolts and said adjusting means longitudinally disposed between said tool points and said coupling means.

9. An apparatus as claimed in claim 8 wherein said adjusting means comprises an adjusting bolt engaging one of said holders and threadingly connected to another of said holders.

10. A lathe assembly for simultaneously machining surfaces on opposite sides of a thin wall of an annular workpiece, said lathe assembly comprising:

a chuck operable for rotating the annular workpiece about a chuck axis, a tool support operable to translate axially and radially with respect to said chuck axis, a tandem point tool for simultaneously machining surfaces on opposite sides of the wall, said tool mounted in said tool support and comprising;

spaced apart first and second tool points, said first and second tool points mounted in first and second tool holders respectively, a coupling means for coupling said first and second tool holders together to maintain said first and second tool points in tandem during a machining operation on the opposite sides of the wall, and said coupling means comprising a longitudinally spaced apart pair of coupling bolts disposed through said first and second tool holders.

11. A lathe assembly as claimed in claim 10 further comprising an adjusting means for adjusting a space between said tool points, said adjusting means longitudinally disposed between said tool points and said coupling means.

12. A lathe assembly as claimed in claim 11 wherein said adjusting means includes tandem adjusting means for simultaneously adjusting said space between said tool points.

13. A lathe assembly as claimed in claim 12 further comprising a spacer between said holders extending longitudinally over a portion of a length of said holders such that said adjusting means is longitudinally disposed between said tool points and said spacer.

14. A lathe assembly as claimed in claim 11 wherein:

said tool holders are longitudinally extending parallel tool bars having tool point inserts mounted at aft portions of said bars, a longitudinally extending spacer is disposed between said bars at forward portions of said bars, said tool points are on inserts mounted at aft positions of said bars such that a longitudinally extending gap lies between said spacer and said tool points, and an adjusting means for adjusting said gap, said adjusting means longitudinally disposed between said spacer and said tool points.

15. A lathe assembly as claimed in claim 14 wherein said adjusting means comprises an adjusting bolt engaging one of said bars and threadingly connected to another of said bars.

* * * * *